(12) United States Patent  
Haut

(10) Patent No.: US 12,515,379 B2  
(45) Date of Patent: Jan. 6, 2026

(54) METHOD OF MANUFACTURING A MOLD FOR INJECTION MOLDING

(71) Applicant: Hella GmbH & Co. KGaA, Lippstadt (DE)

(72) Inventor: Dietmar Haut, Lippstdt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 136 days.

(21) Appl. No.: 17/818,431

(22) Filed: Aug. 9, 2022

(65) Prior Publication Data

US 2022/0379535 A1  Dec. 1, 2022

Related U.S. Application Data

(63) Continuation of application No. PCT/EP2020/054018, filed on Feb. 17, 2020.

(51) Int. Cl.

| | |
|---|---|
| B29C 33/38 | (2006.01) |
| B23K 26/0622 | (2014.01) |
| B23K 26/362 | (2014.01) |
| B29C 33/56 | (2006.01) |
| B29C 45/37 | (2006.01) |

(Continued)

(52) U.S. Cl.

CPC ...... B29C 33/3842 (2013.01); B23K 26/0624 (2015.10); B23K 26/362 (2013.01); B29C 33/56 (2013.01); B29C 45/372 (2013.01); C23C 18/1692 (2013.01); C23C 18/182 (2013.01)

(58) Field of Classification Search

CPC ............ C23C 18/1689; C23C 18/1692; C23C 18/1694; C23C 18/1696; C23C 18/1698; C23C 18/18; C23C 18/1803; C23C 18/1806; C23C 18/1813; C23C 18/182; B29C 33/33842–3892

See application file for complete search history.

(56) References Cited

U.S. PATENT DOCUMENTS

| | | | |
|---|---|---|---|
| 4,830,889 A * | 5/1989 | Henry | ...................... C23C 18/34 427/437 |
| 6,875,379 B2 * | 4/2005 | Glenn | ................... B29C 33/565 264/1.24 |

(Continued)

FOREIGN PATENT DOCUMENTS

| | | | |
|---|---|---|---|
| JP | 2003022585 A | * | 1/2003 |
| JP | 2012051175 A | * | 3/2012 |

(Continued)

OTHER PUBLICATIONS

Anonymous, "Für Werkzeuge nur das Beste", Jun. 10, 2014 (Jun. 10, 2014), p. 1-8, Retrieved from the Internet: URL:https://www.wotech-technical-media.de/womag/ausgabe/2014/06/22_novoplan_dispersion_06j2014/22_novoplan_dispersion_06j2014.php.

(Continued)

Primary Examiner — Atul P. Khare  
(74) Attorney, Agent, or Firm — Husch Blackwell LLP

(57) ABSTRACT

A method is provided for manufacturing a mold for injection molding, especially for injection molding of optical components of automotive lighting devices. The method includes at least the following steps: providing a mold body, laser milling a pattern into a surface of the mold body, and coating the surface of the mold body by electroless nickel plating.

5 Claims, 2 Drawing Sheets

(51) Int. Cl.
*C23C 18/16* (2006.01)
*C23C 18/18* (2006.01)

(56) References Cited

U.S. PATENT DOCUMENTS

| | | | | |
|---|---|---|---|---|
| 7,785,098 | B1* | 8/2010 | Appleby | G21K 1/025 264/319 |
| 8,333,360 | B2* | 12/2012 | Rule | C08F 232/08 526/248 |
| 9,823,392 | B2* | 11/2017 | Masuyama | B29D 11/00884 |
| 10,850,273 | B2* | 12/2020 | Suzuki | B29C 35/0805 |
| 11,712,828 | B2* | 8/2023 | Onishi | B29C 33/42 425/542 |
| 2017/0341074 | A1* | 11/2017 | Suzuki | B29C 33/38 |
| 2019/0263023 | A1* | 8/2019 | Berg | B29C 33/3842 |
| 2022/0379534 | A1* | 12/2022 | Haut | B29C 33/56 |
| 2023/0364838 | A1* | 11/2023 | Haut | B29C 45/14778 |

FOREIGN PATENT DOCUMENTS

| | | | | |
|---|---|---|---|---|
| KR | 20060058258 A | * | 5/2006 | B29C 59/02 |
| WO | WO-9932268 A1 | * | 7/1999 | B29C 33/38 |
| WO | WO-2012096429 A1 | * | 7/2012 | B29C 33/38 |

OTHER PUBLICATIONS

Richard Pergler, "Lasertexturieren—Lichtschnell zur präzisen Ätznarbung", Oct. 20, 2015 (Oct. 20, 2015), p. 1-9, Retrieved from the Internet: URL:https://www.werkzeug-formenbau.de/trends-innnovationen/technologie/lichtschnell-zur-praezisen-aetznarbung-115.html.

Günter Dobberschütz, "Wärmebehandlung von chemisch Nickel Schichten 1. Haftungs-Tempem", Mar. 4, 2011 (Mar. 4, 2011), p. 1-8, Retrieved from the Internet: URL:https://www.chemisch-nickel.com/Tempern%20von%20chemisch%20Nickel%20Schichten.pdf.

"Formulation and production of fine chemicals with new functions", Zhou Chunshan, pp. 204-205, Central South University of Industry Press, Dec. 1998.

"Proceedings of the Annual Meeting of Anhui Association for Science and Technology, Mechanical Engineering in 2008", Liu Guangfu.

Chinese Office Action dated Jan. 12, 2024. issued in corresponding Chinese application.

* cited by examiner

METHOD OF MANUFACTURING A MOLD FOR INJECTION MOLDING

CROSS REFERENCE

This application claims priority to PCT Application No. PCT/EP2020/054018, filed Feb. 17, 2020, the entirety of which is hereby incorporated by reference

FIELD OF THE INVENTION

The present invention relates to a method of manufacturing a mold for injection molding, especially for injection molding of optical components of automotive lighting devices.

BACKGROUND OF THE INVENTION

Molds for injection molding comprise a mold body with a cavity, which represents the negative form of the parts to be manufactured. The surface of the mold body is subject to various requirements concerning e.g., surface quality, wear resistance or tribological properties. Therefore, the state-of-the-art comprises a large number of different methods to manufacture mold bodies with tailored surface properties depending on the precise application.

In the field of automotive lighting devices, many optical components are commonly manufactured by means of injection molding, e.g., single lenses, micro-lens arrays, reflectors, diffusors, diffractive and holographic elements, anti-reflex structures, optical fibres, light guides, thickwall optics or cover lenses. A crucial property of such optical components is their surface condition, which significantly determines the functionality of the components in terms of light manipulation. Smooth surfaces are required e.g., for highly efficient lenses or reflectors, whereas a precise roughness level or dedicated surface patterns are mandatory for light diffusing or diffracting elements, for homogenization and holographic optics. The surface condition of the molded optical components is directly determined by the surface condition of the respective molds, which therefore has to meet high quality requirements. Additionally, since optical components for automotive devices are typically mass products, the tool life of the molds, and especially their surface condition, should be very long-lasting.

Manufacturing of molds with patterned surfaces, i.e. surfaces with dedicated structures to be transferred into the surface of the molded part, are particularly demanding to manufacture, especially if precise surface patterns with characteristic length on the order of only few micrometers are required. Mold bodies are commonly machined from tool steel workpieces, the surfaces of which typically cannot be patterned by traditional machining methods with microscopic resolution and precision. Therefore, in the state-of-the-art, dedicated insets for the mold bodies are used to form the actual cavities.

For patterned molds for injection molding of optical components, e.g., of automotive lighting devices, such insets are commonly manufactured from a nickel alloy via a complex, multi-step galvanic route. Several drawbacks are associated with this galvanic manufacturing method. The inset surfaces are frequently deteriorated by defect areas from incomplete removal of the bath electrolyte during intermediate steps in the manufacturing process. These flaws are subsequently transferred to the molded parts thus impairing the product quality. Furthermore, the generation of patterned surfaces on bended insets or insets of more complex three-dimensional shape is difficult, so that such insets are typically composed of several subunits, which results in stitching errors in the surface patterns. Moreover, the manufacturing of nickel insets according to the state-of-the-art is both time-consuming and costly to an undesired extent.

BRIEF SUMMARY OF THE INVENTION

It is an object of the present invention to provide an alternative method of manufacturing a mold for injection molding, wherein the method is especially appropriate to manufacture molds with precisely patterned surfaces.

The invention discloses the technical teaching that the method of joining comprises at least the following steps: providing a mold body; laser milling a pattern into a surface of the mold body; coating the surface of the mold body by electroless nickel plating.

The invention includes the use of laser milling to generate the surface pattern in combination with subsequent electroless nickel plating for a defined and durable surface finish. Laser milling with pulsed laser sources, especially ultrashort pulses in the femtosecond range, is capable of patterning surfaces of various materials with lateral resolution well below 10 µm or in the case of periodic surface structures even with submicron resolution using multi-beam interference techniques. Laser milling is based on the physical process of laser ablation, i.e. sublimation of an irradiated material volume. Laser milling can be applied to mold bodies with complex three-dimensional surface contours. The subsequent coating of the patterned mold surface is performed by electroless nickel plating. Electroless nickel plating is an autocatalytic process, in which the reduction of nickel ions in a solution and the nickel coating deposition are carried out through the oxidation of a chemical compound present in the solution itself, i.e., a reducing agent like hydrated sodium hypophosphite, which supplies electrons. Unlike electroplating, it is not necessary to pass an electric current through the plating solution to form the nickel deposit. Electroless nickel plating creates homogeneous coatings regardless of the geometry of the mold body surface and can even be applied to non-conductive surfaces depending on the catalyst. Electroless nickel coatings exhibit a very dense microstructure and are thus appropriate as corrosion protection for the mold body. The composition of electroless nickel coatings comprises apart from nickel typically also a certain amount of phosphorous. Furthermore, co-deposition and incorporation of hard particles, e.g., Al2O3 or SiC, can lead to improved wear resistance and extended tool life of the coated mold.

As a preferred embodiment of the invention the mold is heat treated after coating at a temperature in the range of 200° C. to 400° C. for a period in the range of 1 hour to 10 hours. This heat treatment yields a significant hardening of the electroless nickel and thus improves its resistance against mechanical wear. Right after plating, the electroless nickel exhibits an amorphous microstructure, which is converted by the heat treatment into crystalline nickel and a hard nickel phosphide phase. Hardness levels up to 75 HRC can be reached in heat-treated electroless nickel coatings.

Advantageously, laser milling generates the surface pattern with a spatial resolution in the range of 1 µm to 10 µm. These dimensions are most appropriate for molds dedicated for injection molding of optical parts with light diffusing or light diffracting properties or for holographic applications. Such high-precision laser patterning of the mold surface yields highly efficient optical components as molded products, because the effective photometric surface area is larger than in conventionally patterned surfaces.

Advantageously, the coating process generates an electroless nickel coating with a thickness in the range of 2 μm to 20 μm. The precise choice of the coating thickness depends on various criteria, e.g., the characteristic structure size of the surface pattern, the surface roughness level after laser milling or the desired wear protection capability of the nickel coating. A thin nickel coating for example can preserve the surface roughness introduced by the laser milling, which can be desired for molded optical components with a certain light diffusing effect. If a smooth surface with minimum roughness is required, a high coating thickness is appropriate to cover and flatten the roughness of the milled mold body surface.

Preferably, the mold body is provided from a metallic material, e.g., a tool steel or an aluminium alloy or a copper-beryllium alloy. Such metallic materials are appropriate for machining, laser milling and electroless nickel plating, and provide a suitable persistence and durability of the mold body for use in mass production of mold injection components.

Furthermore, the invention concerns a mold for injection molding, especially for injection molding of optical components of automotive lighting devices, manufactured by one of the aforementioned embodiments of the inventive method.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Figure 1:
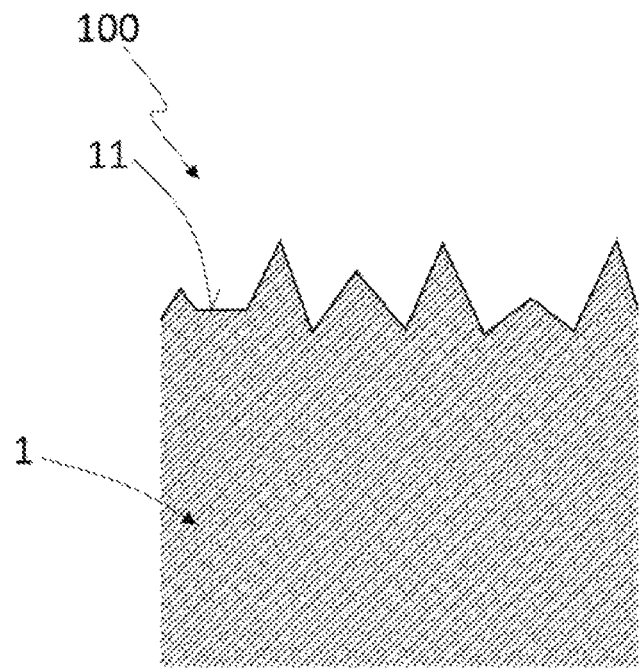
FIG. 1 is an illustration of a cross-section of a mold body according to a first step of the inventive method.

Providing 100 the mold body 1 is illustrated in FIG. 1 as the first step of the inventive method. The mold body 1 is advantageously machined from a tool steel by means of milling and/or electrical discharge machining. The surface 11 is oriented towards the cavity of the mold and thus has to be functionalized according to the inventive method in order to provide the desired surface quality of the parts to be molded. The topography of the surface 11 of the as-provided mold body 1 is determined by the machining process, namely the surface waviness and the different orders of surface roughness.

Figure 2:
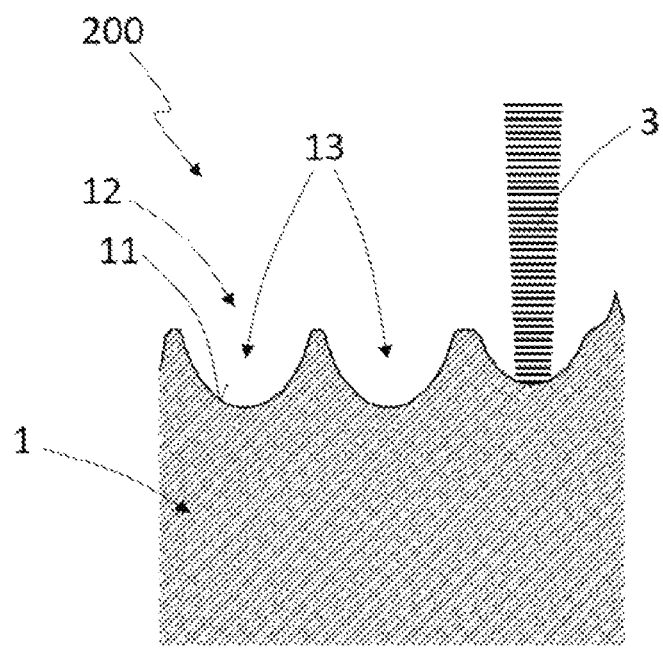
FIG. 2 is a illustration of a cross-section of a mold body according to a second step.

FIG. 2 illustrates the second step of the inventive method, namely laser milling 200 a pattern 12 into the surface 11 of the mold body 1. To this end, the laser beam 3 travels over the surface 11 along programmed trajectories and yields a local material ablation at a high spatial resolution, e.g., in the range of 1 μm to 10 μm. The laser beam 3 typically operates in pulsed mode, e.g., with femtosecond pulses. Advantageously, a multi-beam laser unit is applied for high surface ablation rates. The pattern 12 in the example of FIG. 2 features the micro-cavities 13, which exhibit hemispherical shapes and are equally spaced in a periodic arrangement. Such a pattern 12 is for instance dedicated to mold an optical component with a surface array of micro-lenses. Beyond the example illustrated here, laser milling is appropriate to generate a vast variety of pattern on complex three-dimensional mold body surfaces for various applications, e.g., micron-sized pattern for molded parts with light-diffracting or light-diffusing properties or for holographic applications.

Figure 3:
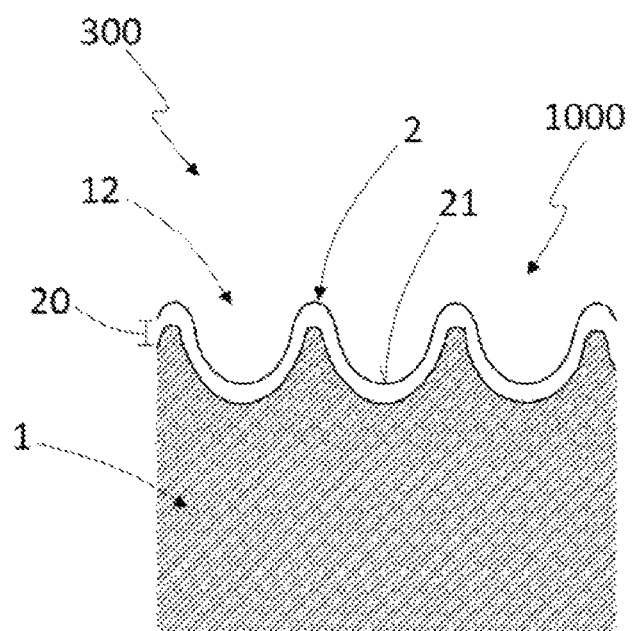
FIG. 3 is an illustration of a cross-section of a mold body according to a third step.

FIG. 3 illustrates the third step of the inventive method, namely coating 300 the surface 11 of the mold body 1 by electroless nickel plating, finally forming the inventive mold 1000. The nickel or nickel alloy coating 2 features a thickness 20 advantageously in the range of 2 μm to 20 μm. The microscopic pattern 12 is preserved by the coating 2, but the highest order, nanoscale roughness of the surface 11 of the mold body 1 right after laser milling 200 is advantageously smoothed and the surface 21 of the coating 2 exhibits high brilliance.

Depending on the detailed plating process, the coating 2 comprises pure nickel or a nickel alloy, e.g., an alloy comprising phosphorus or boron. The coating 2 can additionally comprise incorporations of co-deposited ceramic particles. Advantageously, after the process of coating 300 the mold 1000 is subject to a heat treatment in order to maximise the hardness and thus wear resistance of the coating 2. Hardness levels above 75 HRC can be typically obtained by a heat treatment at a temperature in the range of 200° C. to 400° C. for a period in the range of 1 hour to 10 hours.

The inventive mold 1000 is thus characterized by the combination of a precisely laser patterned surface with a coating providing brilliant gloss and wear resistance. The inventive mold 1000 is therefore especially appropriate to comply with high surface quality standards for injection molding of optical components, e.g., of automotive lighting devices.

The present invention is not limited by the embodiment described above, which is represented as an example only and can be modified in various ways within the scope of protection defined by the appending patent claims.

List of Numerals
1000 mold
1 mold body
11 mold body surface
13 pattern
13 micro-cavity
2 coating
20 coating thickness
21 coating surface
3 laser beam
100 providing the mold body
200 laser milling into the mold body surface
300 coating the mold body surface

I claim:

1. A method of manufacturing a mold for injection molding, the method comprising the following steps:
   providing a mold body,
   laser milling a pattern into a surface of the mold body via ultrashort laser pulses in the femtosecond range, wherein the laser milling is performed using a multi-beam laser unit, and
   coating the surface of the mold body by electroless nickel plating,
   wherein the coating the surface of the mold body includes co-deposition of particles of aluminum oxide or silicone carbide.

2. The method according to claim 1, further comprising heat treating the mold body after the coating the surface of the mold body, wherein the heat treating is performed at a temperature in the range of 200° C. to 400° C. for a period in the range of 1 hour to 10 hours.

3. The method according to claim 1, wherein the laser milling generates the pattern with a spatial resolution in the range of 1 μm to 10 μm.

4. The method according to claim 1, wherein the coating of the surface generates an electroless nickel coating with a thickness in the range of 2 μm to 20 μm.

5. The method according to claim 1, wherein the mold body is formed from a metallic material.

* * * * *